United States Patent [19]

Seibert et al.

[11] Patent Number: 4,909,488

[45] Date of Patent: Mar. 20, 1990

[54] GAS SPRING HAVING A PLURALITY OF PRESSURE CHAMBERS ARRANGED ONE BEHIND ANOTHER

[75] Inventors: Karl Seibert; Horst Kaufmann, both of Koblenz, Netherlands

[73] Assignee: Stabilus GmbH, Koblenz-Neuendorf, Fed. Rep. of Germany

[21] Appl. No.: 358,689

[22] Filed: May 30, 1989

[30] Foreign Application Priority Data

Jun. 3, 1988 [DE] Fed. Rep. of Germany ....... 3818811

[51] Int. Cl.$^4$ .............................................. F16F 9/02
[52] U.S. Cl. ................... 267/64.11; 267/64.25; 267/120; 267/124
[58] Field of Search ...................... 267/64.11, 120, 124, 267/113, 116, 129, 64.25, 64.26, 64.28; 188/320, 317, 312, 284, 322.15; 280/711; 16/66, 84

[56] References Cited

U.S. PATENT DOCUMENTS

| | | | |
|---|---|---|---|
| 2,554,807 | 5/1951 | Bingham | 267/64.25 |
| 2,959,410 | 11/1960 | Fullam et al. | 267/64.26 |
| 3,656,632 | 4/1972 | Karakashian et al. | 267/64.25 X |
| 3,751,023 | 8/1973 | Thomas | 267/64.26 |
| 4,054,277 | 10/1977 | Sirven | 267/64.25 X |
| 4,303,231 | 12/1981 | Reuschenbach et al. | 267/120 X |
| 4,373,707 | 2/1983 | Mölders | 267/120 X |
| 4,408,751 | 10/1983 | Dodson et al. | 267/64.11 X |
| 4,467,899 | 8/1984 | Molders et al. | |
| 4,506,869 | 3/1985 | Mosclet et al. | 267/64.25 X |
| 4,593,890 | 6/1986 | Van Der Laarse | 267/64.25 |
| 4,718,647 | 1/1988 | Ludwig | 267/64.11 |

FOREIGN PATENT DOCUMENTS 1152579 2/1964 Fed. Rep. of Germany .
2228302 12/1972 Fed. Rep. of Germany .

Primary Examiner—Douglas C. Butler
Attorney, Agent, or Firm—Brumbaugh, Graves, Donohue & Raymond

[57] ABSTRACT

According to an illustrative example of the invention a cylinder is subdivided by a stationary partition wall into two pressure chambers. A first piston rod is sealingly introduced from atmosphere through one end wall of the cylinder into a first pressure chamber provided on one side of the partition wall. A second piston rod sealingly extends through said partition wall from the first pressure chamber on one side of the partition wall to a second pressure chamber on the other side of the partition wall. A lower gas pressure is provided in the first pressure chamber and a higher gas pressure is provided in the second pressure chamber. Abutment faces are allocated to the first and to the second piston rod. On inward movement of the first piston rod with respect to the cylinder the abutment faces enter into engagement after a predetermined path of inward movement of the first piston rod.

9 Claims, 2 Drawing Sheets

GAS SPRING HAVING A PLURALITY OF PRESSURE CHAMBERS ARRANGED ONE BEHIND ANOTHER

BACKGROUND OF THE INVENTION

This invention relates to a gas spring having a plurality of pressure chambers arranged one behind another within a cylinder.

STATEMENT OF THE PRIOR ART

From German Patent 2,228,302 a gas spring is known which possesses in the region of a cylinder bottom a cylinder section which is formed with reduced diameter, in comparison with the working chamber of the gas spring, and into which, as from a predetermined inward stroke of the piston rod, the latter penetrates in sealing manner. Thus it is achieved that on inward movement of the piston rod, as from a predetermined stroke, a great rise of the inward thrust force becomes necessary, whereby the stroke of the piston rod is subject to an increased inward movement resistance adjacent to the inner end portion of the inward movement. On the other hand, in the outward movement of the piston rod at the beginning of the stroke an increased outward thrust force is exerted upon the piston rod. By reason of the great pressure rise in the driving of the piston rod into the cylinder section with reduced internal diameter, this construction acts rather as a pressure stop. An easy adaptation of the spring force rise acting in the inward stroke of the piston rod is not possible without a comprehensive design modification. This already appears from the fact that in the outward movement of the displacement body from the cylinder section with reduced internal diameter the same pressure prevails in this cylinder section as in the working chamber of the gas spring.

A further gas spring design is known from German Patent 1,152,579, where several telescopically arranged cylinders are provided which each form the displacement piston for the next larger cylinder. These cylinders are closed off in pressure-tight manner from one another and filed with differently compressed gases, a compressed-gas inlet valve being allocated to each cylinder. The assembly of such a gas spring is very complicated, and the mutually cooperating cylinders must be very precisely produced so that the requisite seal quality is guaranteed. The sealings of the individual cylinders are to be effected in each case in relation to the atmosphere, so that the pressure differences acting upon the seals are very high.

OBJECT OF THE INVENTION

It is the problem of the present invention to produce a gas spring which possesses, as from a pre-determined inward stroke of the piston rod, a spring force increase which is adaptable without problem to desired values.

SUMMARY OF THE INVENTION

A gas spring has a plurality of pressure chambers arranged one behind another. These pressure chambers are entered by displacement bodies. A first pressure chamber is formed by a cylinder which comprises at its one end a seal and a guide for a first piston rod. This first piston rod forms a first displacement body. A second pressure chamber is arranged at the other end of the cylinder. The second pressure chamber is closed off from the first pressure chamber by a sealing and guide unit axially fixed in the cylinder. A second piston rod is guided by said sealing and guide unit and forms a second displacement body. The second pressure chamber has a higher filling pressure than the first pressure chamber, and the second piston rod cooperates through abutment means with the first piston rod as from a predetermined inward stroke of the first piston rod.

The filling pressure in the second pressure chamber is thus a criterium for the spring force rise of the gas spring after the second piston rod has entered in abutment relationship with the first piston rod. The filling pressure in the second pressure chamber is in this case always higher than that in the first pressure chamber. The assembly of the gas spring is relatively simple, since the two pressure chambers have the same diameter, so that by way of example the same pistons and the same piston rod seals can be used.

If a greater spring force progression is desired as from a predetermined inward stroke of the piston rod, this is readily possible in that the second piston rod is provided with a larger diameter as compared with the first piston rod.

An especially finely sensitive adjustment of the outward thrust force of the second piston rod is obtained according to a further feature in that the second pressure chamber comprises a separate filling valve arranged adjacent to the bottom of the cylinder.

In order to avoid metallic knocking of the piston rods on one another, according to a further feature of the invention, the abutment means comprise an elastic component. This elastic component may be a rubber buffer secured on the end of the second piston rod.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail by reference to the forms of embodiment as represented in the drawings, wherein.

DESCRIPTION OF THE PREFERRED EMBODIMENTS

Figure 1:
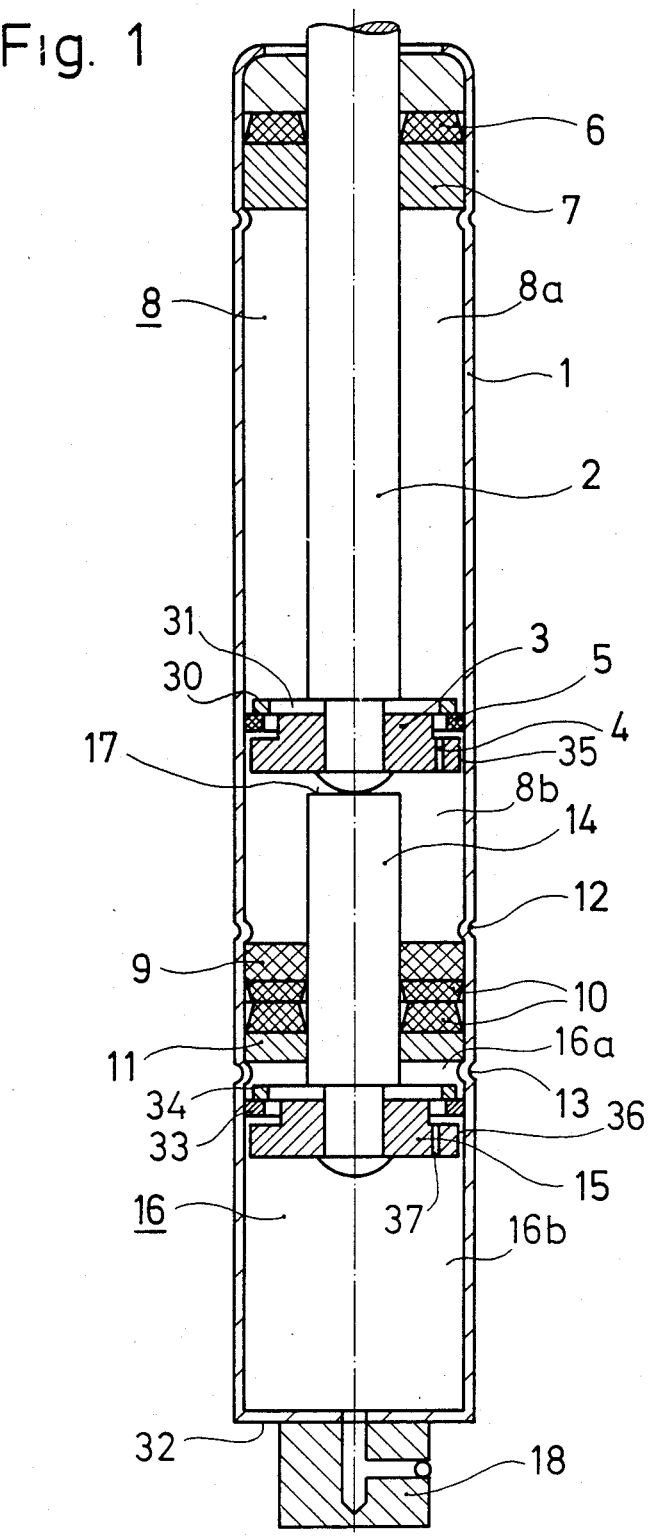
FIG. 1 shows a longitudinal section through a gas spring in accordance with the invention.

The gas spring according to FIG. possesses a cylinder 1, at the upper end of which a piston rod 2 is guided to the exterior. For this purpose a piston rod seal 6 and a piston rod guide 7 are secured on the cylinder end. A piston 3 firmly connected with the first piston rod 2 slides on the inner wall of the cylinder 1. This piston 3 is provided with a constricted bore 4 and possesses, in a piston groove, a piston ring 5 which is arranged at least slightly axially movably in the piston groove. The upper end of the piston groove is defined by a piston washer 30 forming a central passage 31. The interior of the cylinder 1 comprises a first pressure chamber 8 filled with pressurized gas and subdivided by the piston 3 into working chambers 8a and 8b. The pressure chamber 8 is downwardly limited by a thrust washer 9. Between this thrust washer 9 and a lower piston rod guide 11 a piston rod seal 10 is provided which preferably consists of two sealing elements which are installed so that the sealing edges, lying opposite to one another, are in sealing engagement with a second piston rod 14. The seal elements 10 of the second piston rod seal 10 preferably correspond to those of the piston rod seal 6. The construction unit consisting of thrust washer 9, piston rod seal 10 and piston rod guide 11 is secured between a lower corrugation 13 and an upper corrugation 12 in the cylinder 1 and forms the lower partition will for the pressure chamber 8 and a seal and guide unit for the second piston rod 14. Between the bottom 32 of the cylinder 1 and the piston rod guide 11 there is a second pressure chamber 16 which is separated into two working chamber 16a and 16b by the partition wall 9, 10, 11. A second piston 15 is firmly connected with the second piston rod 14 and is axially displaceably arranged. This second piston 15 corresponds to the piston 3, so that this gas spring possesses several identical components. The second pressure chamber 16 is filled with pressurized gas through the filling valve 18, the pressure in the pressure chamber 16 being higher than that in the first pressure chamber 8. As from a specific inward movement of the first piston rod 2, its lower end strikes against an engagement face 17 formed by the end face of the second piston rod 14, and on further inward movement takes this second piston rod 14 with it.

FIG. 1 shows the gas spring in a condition corresponding to inward movement of the piston rods 2 and 14. The piston ring 5 and the corresponding piston ring 33 are applied against the piston washers 30 and 34, respectively. A flow of gas is possible without substantial restriction through the gaps 35 and 36, respectively. In addition to the outward thrust force exerted by the pressure in the first pressure chamber 8 upon the first piston rod 2, a further outwardly directed thrust force is exerted upon the first piston rod 2 by the second piston rod 14, after the piston rods 2 and 14 have entered into abutting engagement as a result of a predetermined inward movement of the piston rod 2. This additional outwardly directed force corresponds to the cross-sectional area of the second piston rod 14 and the pressure difference between the first pressure chamber 8 and the second pressure chamber 16. To make sure that the second piston rod 14 can exert an outward thrust force at all upon the first piston rod 2, the pressure in the second pressure chamber 16 must be greater than that in the first pressure chamber 8. The magnitude of the outward thrust force which issues from the second piston rod 14 and is effective during a predetermined outward stroke, that is until the first piston rod 2 lifts away from the abutment face 17, is determined by the filling pressure in the second pressure chamber 16. The filling of the second pressure chamber 16 here takes place through the filling valve 18. This filling valve 18 can be of a valve type which allows repeated filling. Alternatively, the valve 18 merely comprises a filling bore which is closed by a closure body after the first filling has been terminated. A gas damping is achieved in the outward thrust movement in that then the piston rings 5 and 33 in the pistons 3 and 15, respectively, apply themselves to the lower abutment face of the piston groove and thus close the gaps 35 and 36, respectively. Thus only the constricted bores 4 and 37 are effective.

Figure 2:
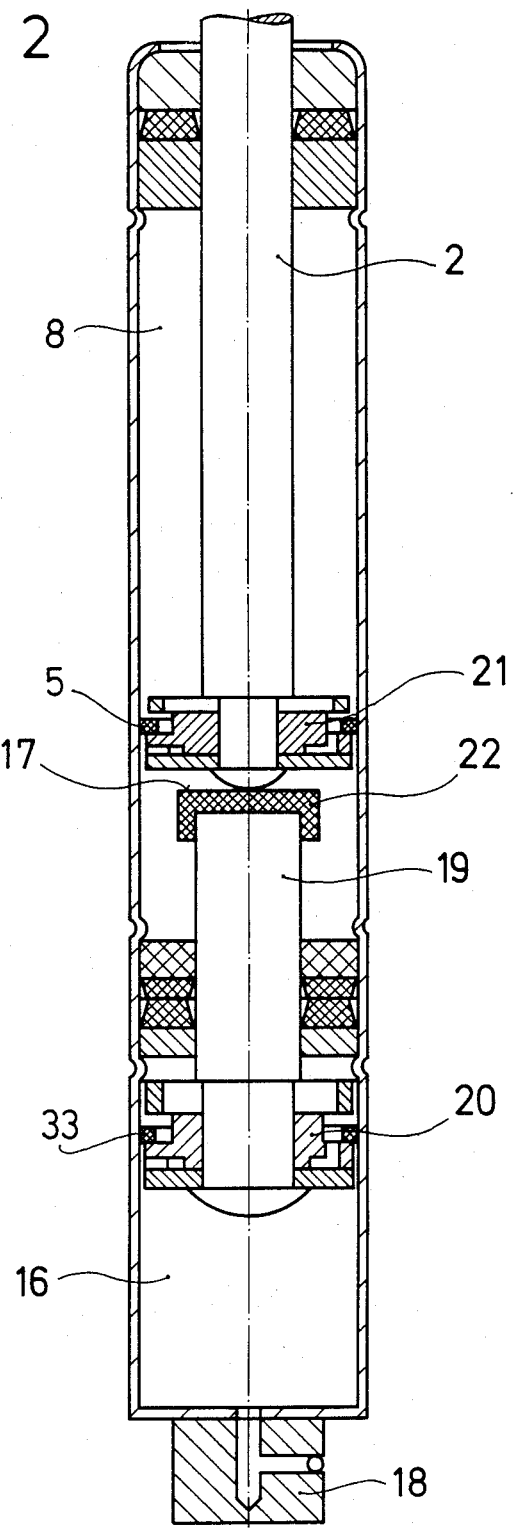
FIG. 2 shows a form of embodiment of the gas spring in longitudinal section, where the piston rod allocated to the second pressure chamber has a larger diameter.

The form of embodiment according to FIG. 2 differs from that according to FIG. 1 essentially in that the second piston rod 19 has a larger diameter than the first piston rod 2. In pushing the second piston rod 19 into the second pressure chamber 16, the piston rod performs a greater compression in the second pressure chamber 16, so that the outward thrust force of the second piston rod 19 rises more greatly with increasing depth of entry into the second pressure chamber 16, and thus a progressive spring force increase is achieved. Here again the second pressure chamber 16 is filled through the filling valve 18, with the pressure in the second pressure chamber 16, less the pressure in the first pressure chamber 8, acting upon the cross-section of the second piston rod 19 and the outward thrust of the second piston rod 19 resulting therefrom. Both the first piston 21 and the second piston 20 have a constricted passage of labyrinth form which is effective for damping in the outward thrust movement. A piston of the labyrinth type is disclosed e.g. in U.S. Pat. No. 4,467,899. The outward thrust movement is shown in FIG. 2, as one can see from the fact that the piston rings 5 and 33 of the pistons 20 and 21 lie against the respective lower faces of the piston grooves. The abutment component 18 which is effective in the cooperation of the first piston rod2 with the second piston rod 19 is formed by a rubber buffer 22 which is secured on the end of the second piston rod 19.

The two forms of embodiment show that by the filling pressure in the second pressure chamber 16 a corresponding spring force rise is produced for the first piston rod 2 as from a specific inward thrust stroke, when this rod 2 lays itself against the second piston rod 14 or 18 and entrains the latter in the further inward movement. The nature of the pressure rise can likewise readily be influenced by the fact that the cross-section of the second piston rod is appropriately selected. In the case of a relatively large piston rod cross-section, as displayed for example by the second piston rod 19 in FIG. 2, a progressively acting outward thrust force is achieved. Accordingly, it is readily possible, in such a spring construction, by appropriate filling pressure in the second pressure chamber 16 and the cross-section of the second piston rod 14 or 19, to bring the spring force rise without problem to desired values.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A gas spring having a plurality of pressure chambers (8, 16) arranged one behind another which are entered by displacement bodies (2, 14), a first pressure chamber (8) being formed by a cylinder (1) which comprises at its one end a seal (6) and a guide (7) for a first piston rod (2) forming a first displacement body (2), while the second pressure chamber (16) is arranged at the other end of the cylinder (1), said second pressure chamber (16) being closed off from the first pressure chamber (8) by a sealing and guide unit (9, 10, 11) axially fixed in the cylinder (1), for a second piston rod (14) forming a second displacement body (14), the second pressure chamber (16) having a higher filling pressure than the first pressure chamber (8), the second piston rod (14) cooperating through abutment means (17) with the first piston rod (2) as from a predetermined inward stroke of said first piston rod (2).

2. A gas spring according to claim 1, characterized in that the second piston rod (19) has a larger diameter compared with the first piston rod (2).

3. A gas spring according to claim 1, characterized in that the second pressure chamber (16) has a separate filling valve (18) arranged adjacent to the bottom (32) of the cylinder (1).

4. A gas spring according to claim 1, characterized in that the abutment means (17) comprise an elastic component (22).

5. A gas spring according to claim 4, characterized in that the elastic component (22) is a rubber buffer (22) secured on the end of the second piston rod (19).

6. A gas spring according to claim 1, characterized in that at least one of said first and said second piston rods (2, 14) are provided with a first and a second piston unit (3, 15), respectively, within the respective pressure chamber (8, 16).

7. A gas spring according to claim 6, characterized in that said at least one piston unit (3, 15) comprises fluid passage means across the respective piston unit (3, 15).

8. A gas spring according to claim 7, characterized in that said fluid passage means have a cross-sectional area responsive to the direction of movement with respect to the cylinder (1), said cross-sectional area being larger in response to inward movement of the respective piston rod (2, 14) into the respective pressure chamber (8, 16) and being smaller in response to outward movement of the respective piston rod (2, 14) with respect to the respective pressure chamber (8, 16).

9. A gas spring according to claim 6, characterized in that said at least one piston unit (3, 15) is a labyrinth-type piston unit.

* * * * *

UNITED STATES PATENT AND TRADEMARK OFFICE
CERTIFICATE OF CORRECTION

PATENT NO. : 4,909,488

DATED : March 20,1990

INVENTOR(S) : Karl Seibert and Horst Kaufmann

It is certified that error appears in the above-identified patent and that said Letters Patent is hereby corrected as shown below:

First page, Item [75], "Netherlands" should read --Federal Republic of Germany--;
Col. 1, line 43, "filed" should read --filled--;
Col. 2, line 9, "criterium" should read --criterion--;
Col. 2, line 55, "FIG." should read --FIG. 1--;
Col. 3, line 12, "will" should read --wall--;
Col. 4, line 26, "rod2" should read --rod 2--.

Signed and Sealed this

Ninth Day of July, 1991

Attest:

HARRY F. MANBECK, JR.

Attesting Officer

Commissioner of Patents and Trademarks